United States Patent [19]

Wurm et al.

[11] 3,824,673

[45] July 23, 1974

[54] METHOD OF TRANSPORTING AND PROCESSING IRRADIATED FUEL ELEMENTS

[75] Inventors: Joseph G. Wurm, Boeretang; Paul R. Heylen, Lijsterdreef, both of Belgium

[73] Assignee: European Atomic Energy Community (Euratom), European Center Kirchberg, Luxembourg

[22] Filed: July 11, 1972

[21] Appl. No.: 270,839

[30] Foreign Application Priority Data

Aug. 4, 1971  Netherlands .................... 7110751

[52] U.S. Cl. ................... 29/403, 53/21 R, 164/108, 176/28, 176/37, 176/68, 176/73
[51] Int. Cl. .......................... B23p 7/00, G21f 9/00
[58] Field of Search .......... 164/98, 108; 176/28, 37, 176/68, 73, 82; 53/21 R; 29/403

[56] References Cited
UNITED STATES PATENTS

| | | | |
|---|---|---|---|
| 2,858,262 | 10/1958 | Plott .......................... | 29/400 N UX |
| 2,894,889 | 7/1959 | Paine ........................... | 176/82 |
| 3,202,585 | 8/1965 | Kling et al. .................. | 176/82 X |
| 3,304,235 | 2/1967 | Granata et al. ............... | 176/82 |
| 3,604,494 | 9/1971 | Trager et al. ................. | 164/91 X |
| 3,704,202 | 11/1972 | Reeve et al. .................. | 176/68 |

FOREIGN PATENTS OR APPLICATIONS

| | | | |
|---|---|---|---|
| 624,569 | 7/1961 | Canada ......................... | 176/68 |

*Primary Examiner*—Charles W. Lanham
*Assistant Examiner*—D. C. Reiley, III
*Attorney, Agent, or Firm*—Stevens, Davis, Miller & Mosher

[57] ABSTRACT

A method for the treatment of irradiated fuel elements of the type consisting of a can containing one or more fissile fuel rods. The space between the fuel rods and the can is filled with an alloy having a melting point of at least 700°C and the alloy is allowed to solidify. The alloy usually has good thermal conductivity.

The method is particularly useful when irradiated fuel elements are to be transported to a processing factory.

5 Claims, No Drawings

METHOD OF TRANSPORTING AND PROCESSING IRRADIATED FUEL ELEMENTS

This invention relates to a method for the treatment of irradiated fuel elements, and more particularly fast reactor fuel elements. Such elements frequently consist of an elongate can of for example, round or hexagonal cross-section containing a number of fissile fuel rods, each coated with a jacket of, for example, stainless steel. During operation of the reactor, a coolant, such as liquid sodium, flows along the fissile fuel rods. After a given cooling period outside the reactor, the irradiated elements are transported to a processing factory where they are cut open and the fissile material is leached out (chop and leach). This transportation is accompanied by difficulties, since the rods may break during transport, and radioactive gases may escape. In addition, the elements must be cooled during transport, because the temperature of the can without cooling can be as much as 600°C and higher, even after storage for many months. For this purpose, a coolant must be used which has good thermal conductivity, such as liquid sodium. It is apparent that such transport is dangerous and complex.

According to the present invention there is provided a method of treating irradiated nuclear fuel elements consisting of an elongate can containing rods of fissile nuclear fuel material wherein the space between the can and the rods is filled with a molten alloy having a melting point of 700°C or above and a boiling point above 1,000°C, and whereafter the alloy is allowed to solidify.

When solid, the alloy — which will hereinafter be referred to as a filling alloy — fills the space between the fissile material rods and the can and performs two important functions. Firstly, the filling alloy stiffens the structure of the fuel element so that the fissile material rods cannot break during transportation, and if they were to break, no radioactive gas could escape. Furthermore, the filling alloy conducts the heat from the rods to the can. Without a filling alloy, this heat can be transmitted to the can only by radiation. It has been found that when the filling alloy is used according to the invention external cooling during transportation can be provided simply by a coolant less efficient than liquid sodium, for example molten salts, and it will be apparent that transportation is then less dangerous.

Another advantage of the filling alloy is that when the element is sawn in the processing factory the fissile material rods remain in place and their coating cannot be pinched off, so that the leaching agent can reach all the fissile material. The leaching agent is preferably a liquid in which the filling alloy does not dissolve, for example molten oxidising salt mixtures.

The filling alloy must have a melting point of 700°C or more, because in the event of any disturbance to the cooling of the outer wall of the can the filling alloy must not melt. A boiling point above 1,000°C is necessary because lower-boiling alloys would evaporate too much during the filling of the fuel element.

Some examples of suitable filling alloys will be given below, without limiting the invention thereto.

1. The Al-Mn alloy containing 10 percent by weight of Mn. This alloy melts at 700°C, flows well, and has a very good thermal conductivity.
2. The Cu-Mg alloy containing 9.7 percent by weight of Mg has a melting point of 722°C and is also a good thermal conductor.
3. The Cu-Si alloy containing 16 percent by weight of Si melts at 802°C and flows well at about 900°C.
3. The Cu-Sn alloy containing 30 percent by weight of Sn has a melting point of 755°C. This alloy has excellent properties but is relatively expensive.

We claim:

1. A method of treating irradiated nuclear fuel elements consisting of filling the space between the can and the rods of an elongate can containing spaced rods of fissile nuclear fuel material with a molten alloy having a melting point of at least 700°C and a boiling point above 1,000°C, solidifying the alloy, then transporting the can and alloy encased rods therein to a processing factory, and further processing the fissile material.
2. A method as claimed in claim 1 wherein the alloy is an alloy of aluminium and manganese containing 10 percent by weight of manganese and having a melting point of 700°C.
3. A method as claimed in claim 1 wherein the alloy is an alloy of copper and magnesium containing 9.7 percent by weight of magnesium and having a melting point of 722°C.
4. A method as claimed in claim 1 wherein the alloy is an alloy of copper and silicon containing 16 percent by weight of silicon and having a melting point of 802°C.
5. A method as claimed in claim 1 wherein the alloy is an alloy of copper and tin containing 30 percent by weight of tin and having a melting point of 755°C.

* * * * *